United States Patent
Uchida et al.

(10) Patent No.: US 11,056,733 B2
(45) Date of Patent: Jul. 6, 2021

(54) FLUE GAS DETECTION SYSTEM AND FLUE GAS DETECTION METHOD

(71) Applicant: TOYOTA JIDOSHA KABUSHIKI KAISHA, Toyota (JP)

(72) Inventors: Yoshihiro Uchida, Nagakute (JP); Kazuki Kubo, Toyota (JP); Nobuyuki Tanaka, Toyota (JP); Kenta Onishi, Kariya (JP); Yuki Moriya, Okazaki (JP); Kiyohito Machida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 138 days.

(21) Appl. No.: 16/352,209

(22) Filed: Mar. 13, 2019

(65) Prior Publication Data

US 2019/0288354 A1    Sep. 19, 2019

(30) Foreign Application Priority Data

Mar. 14, 2018  (JP) .............................. JP2018-047069
Sep. 18, 2018  (JP) .............................. JP2018-173863
Jan. 30, 2019  (JP) .............................. JP2019-014352

(51) Int. Cl.
*H01M 10/625*  (2014.01)
*B60L 58/10*  (2019.01)

(52) U.S. Cl.
CPC ........... *H01M 10/625* (2015.04); *B60L 58/10* (2019.02); *B60L 2240/545* (2013.01); *H01M 2220/20* (2013.01)

(58) Field of Classification Search
None
See application file for complete search history.

(56) References Cited

U.S. PATENT DOCUMENTS

2016/0218333 A1*  7/2016  Takasaki ............. H01M 2/1252

FOREIGN PATENT DOCUMENTS

| JP | 2010-110033 A | 5/2010 |
|---|---|---|
| JP | 2014-523622 A | 9/2014 |
| JP | 2015-220003 A | 12/2015 |
| JP | 2017-091950 A | 5/2017 |
| JP | 2018-026308 A | 2/2018 |
| WO | 2013/006796 A1 | 1/2013 |

* cited by examiner

*Primary Examiner* — Ladan Mohaddes
(74) *Attorney, Agent, or Firm* — Sughrue Mion, PLLC

(57) ABSTRACT

A flue gas detection system includes: a temperature sensor configured to detect a temperature in a duct; a temperature sensor configured to detect a temperature in a duct; and an ECU. The ECU is configured to determine that a high-temperature gas is released from an assembled battery, when a period during which a temperature increase amount in the duct is more than a reference amount and a period during which a temperature increase amount in the duct is more than a reference amount are included in a predetermined period.

8 Claims, 14 Drawing Sheets

FLUE GAS DETECTION SYSTEM AND FLUE GAS DETECTION METHOD

This nonprovisional application is based on Japanese Patent Application Nos. 2018-047069 filed on Mar. 14, 2018, 2018-173863 filed on Sep. 18, 2018, and 2019-014352 filed on Jan. 30, 2019, with the Japan Patent Office, the entire contents of which are hereby incorporated by reference.

BACKGROUND

Field

The present disclosure relates to a flue gas detection system and a flue gas detection method, more particularly, the present disclosure relates to a flue gas detection system provided in an assembled battery and a flue gas detection method for detecting a flue gas from the assembled battery.

Description of the Background Art

In recent years, electrically powered vehicles, such as hybrid vehicles and electric vehicles, have been developed. In each of such electrically powered vehicles, an assembled battery including a plurality of secondary batteries (hereinafter, also referred to as "cells") is mounted.

When a cell is fed with an impact or is overcharged, the cell may exhibit thermal runaway to generate a gas in the cell. Hence, a case of each cell is generally provided with a safety valve (gas release valve) for releasing the gas to outside. Moreover, the electrically powered vehicle is provided with a flue gas duct for exhausting, to outside the electrically powered vehicle, the gas released from the safety valve (for example, see Japanese Patent Laying-Open No. 2017-091950).

SUMMARY

The gas released due to the operation of the safety valve has a high temperature. Hence, for example, Japanese Patent Laying-Open No. 2015-220003 discloses that a temperature sensor is installed in the flue gas duct in order to determine whether or not a high-temperature gas has been released.

When one temperature sensor is installed in the flue gas duct and if the temperature sensor malfunctions, it becomes impossible to determine whether or not a high-temperature gas has been released. Moreover, erroneous detection by the temperature sensor may occur, with the result that it may be erroneously determined that a high-temperature gas has been released although no high-temperature gas has been actually released.

In order to prevent such a situation, when the assembled battery is configured to include a plurality of cells connected in series, it is considered to detect voltages (total voltage value) of all the cells connected in series by installing a voltage sensor in addition to the temperature sensor. When the safety valve of a certain cell is operated to release a high-temperature gas, a short circuit is resulted between positive electrode and negative electrode of the cell. Accordingly, the voltage of the cell is decreased, with the result that the total voltage value of all the cells becomes smaller than the total voltage value thereof when all the cells are normal. Thus, whether or not a high-temperature gas has been released can be determined more precisely by detecting a temperature increase using the temperature sensor and detecting a voltage decrease using the voltage sensor.

On the other hand, for example, there is also an assembled battery configured to include a plurality of cells connected in parallel. When a voltage sensor is installed in the assembled battery thus configured, the voltage sensor may be unable to detect a voltage decrease of a certain cell due to voltages of the other normal cells connected in parallel even though the safety valve of the cell is operated to result in the decreased voltage of the cell. Therefore, it is desirable that whether or not a high-temperature gas has been released is precisely determined without using a voltage sensor and irrespective of a configuration (series connection or parallel connection) of an assembled battery.

The present disclosure has been made to solve the above-described problem, and has an object to improve precision in determining, without using a voltage sensor, whether or not a gas has been released from an assembled battery (i.e., whether or not thermal runaway has occurred in the assembled battery).

(1) A flue gas detection system according to an aspect of the present disclosure is provided in an assembled battery including a plurality of secondary batteries. Each of the plurality of secondary batteries includes a safety valve configured to release, to outside, a gas internally generated. The flue gas detection system includes: a first temperature sensor configured to detect a temperature of a first region in a path in which the gas released from the assembled battery flows; a second temperature sensor configured to detect a temperature of a second region different from the first region in the path; and a determination device. The determination device is configured to determine that the gas is released from the assembled battery, when a first period and a second period are included in a predetermined period, the first period being a period during which a temperature increase amount of the first region is more than a first reference amount, the second period being a period during which a temperature increase amount of the second region is more than a second reference amount.

(2) The flue gas detection system further includes a duct configured to guide, to outside of the flue gas detection system, the gas released from the assembled battery. The first temperature sensor is configured to detect the temperature of the first region in the duct. The second temperature sensor is configured to detect the temperature of the second region in the duct.

According to the configurations in (1) and (2), by duplicating temperature sensors, preparation can be made for malfunction of a temperature sensor without using a voltage sensor. Moreover, a possibility of erroneously detecting a temperature increase not resulting from thermal runaway can be reduced under the following conditions: a condition that the first temperature sensor and the second temperature sensor are provided in the different regions (first and second regions); and a condition that the temperature increase in the first region continues for the first period and the temperature increase in the second region continues for the second period. Further, the conditions include a condition that the first period and the second period are included in the predetermined period (in other words, a temporal difference between times of detection in the two regions is sufficiently small). Hence, the possibility of erroneous detection can be further reduced. As described above, according to the above-described configuration, precision in determining whether or not a gas is released from the assembled battery can be improved without using a voltage sensor.

(3) In the flue gas detection system, the determination device is configured to determine that one of the first and second temperature sensors malfunctions, when the first period and the second period are not included in the predetermined period.

According to the configuration in (3), when the temperature increase is detected by the first temperature sensor but no temperature increase is detected by the second temperature sensor even after passage of a predetermined period (for example, several seconds) from the time of detection of the temperature increase by the first temperature sensor, it is determined that one of the first and second temperature sensors malfunctions, rather than determining that thermal runaway occurs in the assembled battery. Thus, under a condition that temperature increases are detected by the two temperature sensors within the predetermined period, it is determined that the gas is released from the assembled battery (thermal runaway occurs). Accordingly, it is possible to reduce a possibility of erroneously determining that a gas is released even though no gas is actually released.

(4) The determination device is configured to determine that the first temperature sensor malfunctions, when a temperature increase of the first region is detected by the first temperature sensor and when a rate of the temperature increase of the first region is faster than a defined rate.

When an abrupt temperature increase in the path is detected by the first temperature sensor, the first temperature sensor is highly likely to be malfunctioning. Hence, according to the configuration in (4), the possibility of erroneously detecting that a gas is released can be further reduced by setting, as the defined rate, a rate that cannot be obtained in actual thermal runaway. The setting of the rate is based on an experiment result or simulation result, for example.

(5) The assembled battery includes a module. The module includes two or more secondary batteries connected to each other in parallel in the plurality of secondary batteries.

When voltages of a plurality of secondary batteries connected in parallel are monitored by a voltage sensor, even if a secondary battery exhibits thermal runaway to result in a decreased voltage of the secondary battery, the voltage decrease may not be detected while the other secondary batteries are normal. According to the configuration in (5), by using the temperature sensor instead of the voltage sensor, the gas release (thermal runaway) can be detected even in the configuration in which the plurality of secondary batteries are connected in parallel.

(6) A flue gas detection method according to another aspect of the present disclosure is a method for detecting a flue gas from an assembled battery including a plurality of secondary batteries. Each of the plurality of secondary batteries is configured to release, to outside, a gas internally generated. The method includes first to third steps. The first step is a step of detecting, by a first temperature sensor, a temperature of a first region in a path in which the gas released from the assembled battery flows. The second step is a step of detecting, by a second temperature sensor, a temperature of a second region different from the first region in the path. The third step is a step of determining that the gas is released from the assembled battery, when a first period and a second period are included in a predetermined period, the first period being a period during which a temperature increase amount of the first region is more than a first reference amount, the second period being a period during which a temperature increase amount of the second region is more than a second reference amount.

According to the method in (6), as with the configuration in (1), precision in determining whether or not a gas is released from the assembled battery can be improved without using a voltage sensor.

(7) The method further includes a step of determining that one of the first and second temperature sensors malfunctions, when the first period and the second period are not included in the predetermined period.

According to the method in (7), as with the configuration in (3), it is possible to reduce a possibility of erroneously determining that a gas is released even though no gas is actually released.

(8) The step of determining that one of the first and second temperature sensors malfunctions includes a step of determining that the first temperature sensor malfunctions, when a temperature increase of the first region is detected by the first temperature sensor and when a rate of the temperature increase of the first region is faster than a defined rate.

According to the method in (8), as with the configuration in (4), the possibility of erroneously detecting that a gas is released can be further reduced.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
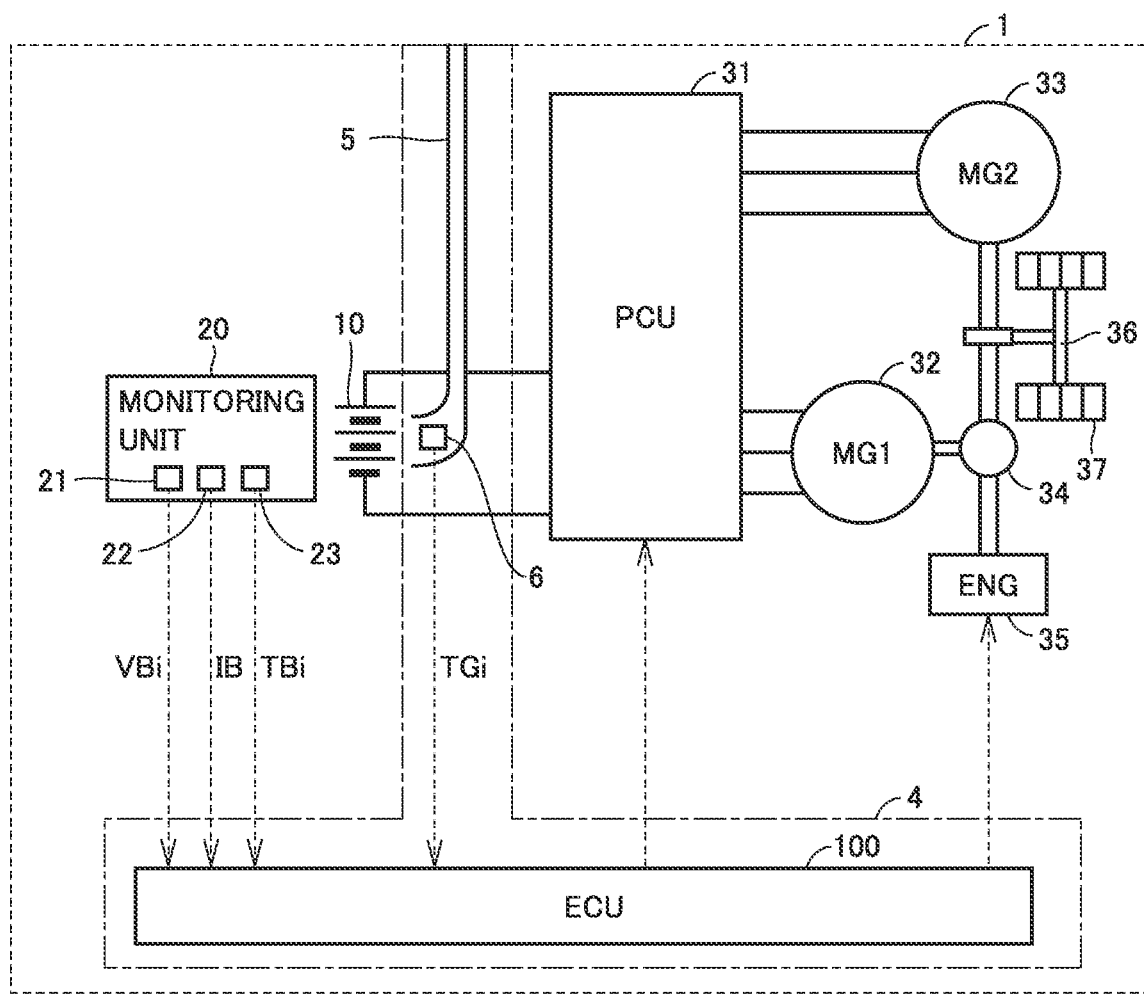
FIG. 1 schematically shows an entire configuration of a vehicle including a flue gas detection system according to a first embodiment.

The following describes the present embodiment with reference to figures in detail. It should be noted that the same or corresponding portions in the figures are given the same reference characters and are not described repeatedly.

First Embodiment

<Entire Configuration of Vehicle>

FIG. 1 schematically shows an entire configuration of a vehicle including a flue gas detection system according to a first embodiment. The following describes a case where a vehicle 1 is a hybrid vehicle; however, the flue gas detection system according to the present disclosure is applicable to not only the hybrid vehicle but also all the types of vehicles each including an assembled battery for the purpose of traveling (for example, a plug-in hybrid vehicle or an electric vehicle).

With reference to FIG. 1, vehicle 1 includes an assembled battery 10, a monitoring unit 20, and a power control unit (PCU) 31, motor generators 32, 33, a power split device 34, an engine 35, a drive shaft 36, a driving wheel 37, and a flue gas detection system 4.

Assembled battery 10 is configured to include a plurality of cells. Each cell is a secondary battery ("secondary battery" in the present disclosure) such as a lithium ion secondary battery or a nickel-metal hydride battery. Assembled battery 10 stores electric power for driving motor generators 32, 33, and supplies electric power to motor generators 32, 33 through PCU 31. Moreover, when motor generators 32, 33 generate electric power, assembled battery 10 is supplied with the generated electric power through PCU 31 and is therefore charged therewith.

Monitoring unit 20 monitors a state of assembled battery 10, and sends the monitoring result to ECU 100. Monitoring unit 20 includes a voltage sensor assembly 21, a current sensor 22, and a temperature sensor 23. Details of configurations of assembled battery 10 and monitoring unit 20 will be described with reference to FIG. 2.

In accordance with a control signal from ECU 100, PCU 31 performs bidirectional power conversion between assembled battery 10 and motor generators 32, 33. PCU 31 is configured to control respective states of motor generators 32, 33 separately. For example, PCU 31 can bring motor generator 32 into a regenerative state (power generation state) and can bring motor generator 33 into a power running state. For example, PCU 31 is configured to include: two inverters (not shown) provided to correspond to motor generators 32, 33; and a converter (not shown) configured to boost DC voltage supplied to each inverter to be more than or equal to an output voltage of assembled battery 10.

Each of motor generators 32, 33 is an AC rotating electrical machine, such as a three-phase AC synchronous motor including a rotor having a permanent magnet embedded therein. Motor generator 32 is mainly used as an electric power generator driven by engine 35 via power split device 34. Electric power generated by motor generator 32 is supplied to motor generator 33 or assembled battery 10 through PCU 31. Motor generator 33 is mainly operated as an electric motor, and drives driving wheel 37. Motor generator 33 is driven by receiving at least one of the electric power from assembled battery 10 and the electric power generated by motor generator 32, and driving power of motor generator 33 is transmitted to drive shaft 36. On the other hand, during braking of the vehicle or during reduction of acceleration at a downhill, motor generator 33 is operated as an electric power generator, and performs regenerative power generation. Electric power generated by motor generator 33 is supplied to assembled battery 10 through PCU 31.

Power split device 34 includes a planetary gear mechanism (not shown) having three rotation axes of a sun gear, a carrier, and a ring gear, for example. Power split device 34 splits motive power output from engine 35 into motive power for driving motor generator 32 and motive power for driving driving wheel 37.

Engine 35 outputs motive power by converting combustion energy, which is produced when combusting an air-fuel mixture of air and fuel, into kinetic energy for a kinetic element such as a piston or a rotor.

<Configuration of Flue Gas Detection System>

When each cell included in assembled battery 10 is fed with an impact or is overcharged, the cell may exhibit thermal runaway to generate a high-temperature gas therein. For this reason, a safety valve 7 (see FIG. 3) is provided in the case of each cell. When pressure in the case is increased due to the generation of the high-temperature gas, safety valve 7 is broken (opened) to release the high-temperature gas in the case to outside the case. Flue gas detection system 4 detects the release of the high-temperature gas from assembled battery 10. Accordingly, it can be determined whether or not thermal runaway has occurred in assembled battery 10. More specifically, in the first embodiment, flue gas detection system 4 includes a flue gas duct 5, a temperature sensor assembly 6, and a controller (ECU: Electronic Control Unit) 100.

Flue gas duct 5 is provided to exhaust, to the outside of vehicle 1, the high-temperature gas released from assembled battery 10. One end of flue gas duct 5 is provided near assembled battery 10. The other end of flue gas duct 5 is provided with an outlet communicated with the outside of the vehicle.

Figure 3:
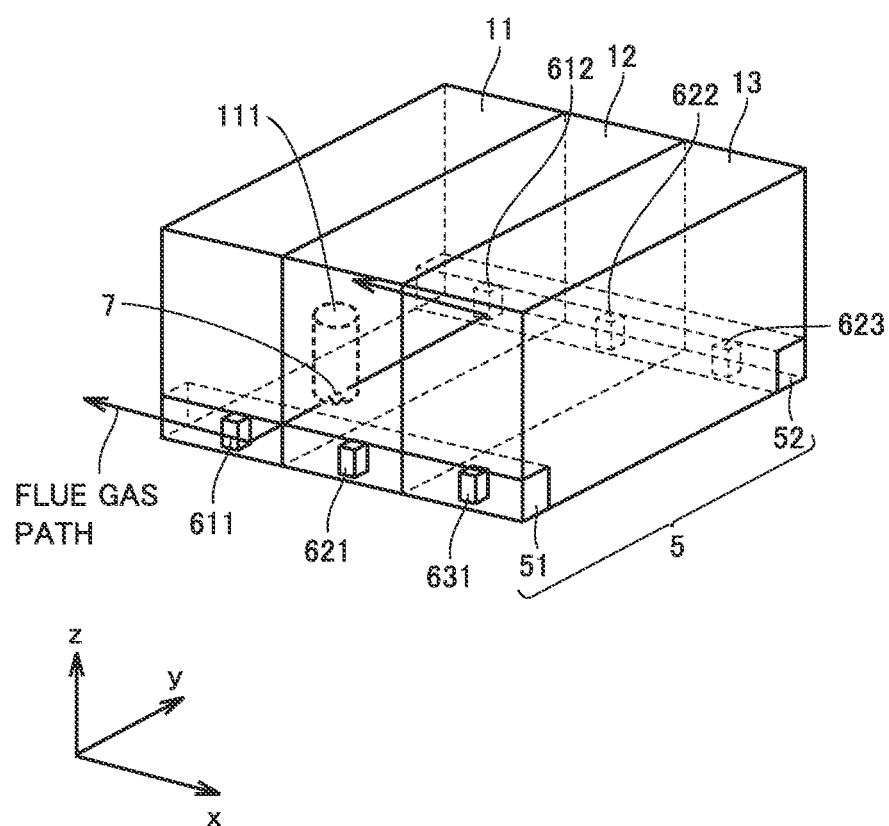
FIG. 3 is a schematic view showing exemplary configurations of a flue gas duct and a temperature sensor assembly.

In flue gas duct 14, temperature sensor assembly 6 detects a temperature (such as temperature TG1, TG2 as described below) of the high-temperature gas released from safety valve 7 and flowing through flue gas duct 5, and outputs a detection result thereof to ECU 100. For each sensor included in temperature sensor assembly 6, a thermistor can be employed, for example. FIG. 3 illustrates a configuration of temperature sensor assembly 6.

ECU 100 is configured to include a CPU (Central Processing Unit), a memory, and an input/output port for sending and receiving various signals (all not shown). ECU 100 controls each device (PCU 31, engine 35, and the like) of vehicle 1 based on a signal received from each sensor as well as program and map stored in the memory. ECU 100 may be divided into a plurality of ECUs based on corresponding functions.

Examples of a main process performed by ECU 100 (corresponding to the "determination device" according to the present disclosure) in the first embodiment includes a "temperature increase detection process" and a "thermal runaway determination process" each for determining occurrence of thermal runaway in assembled battery 10 by detecting the gas released from assembled battery 10. These processes will be also described in detail later.

<Configuration of Assembled Battery>

Figure 2:
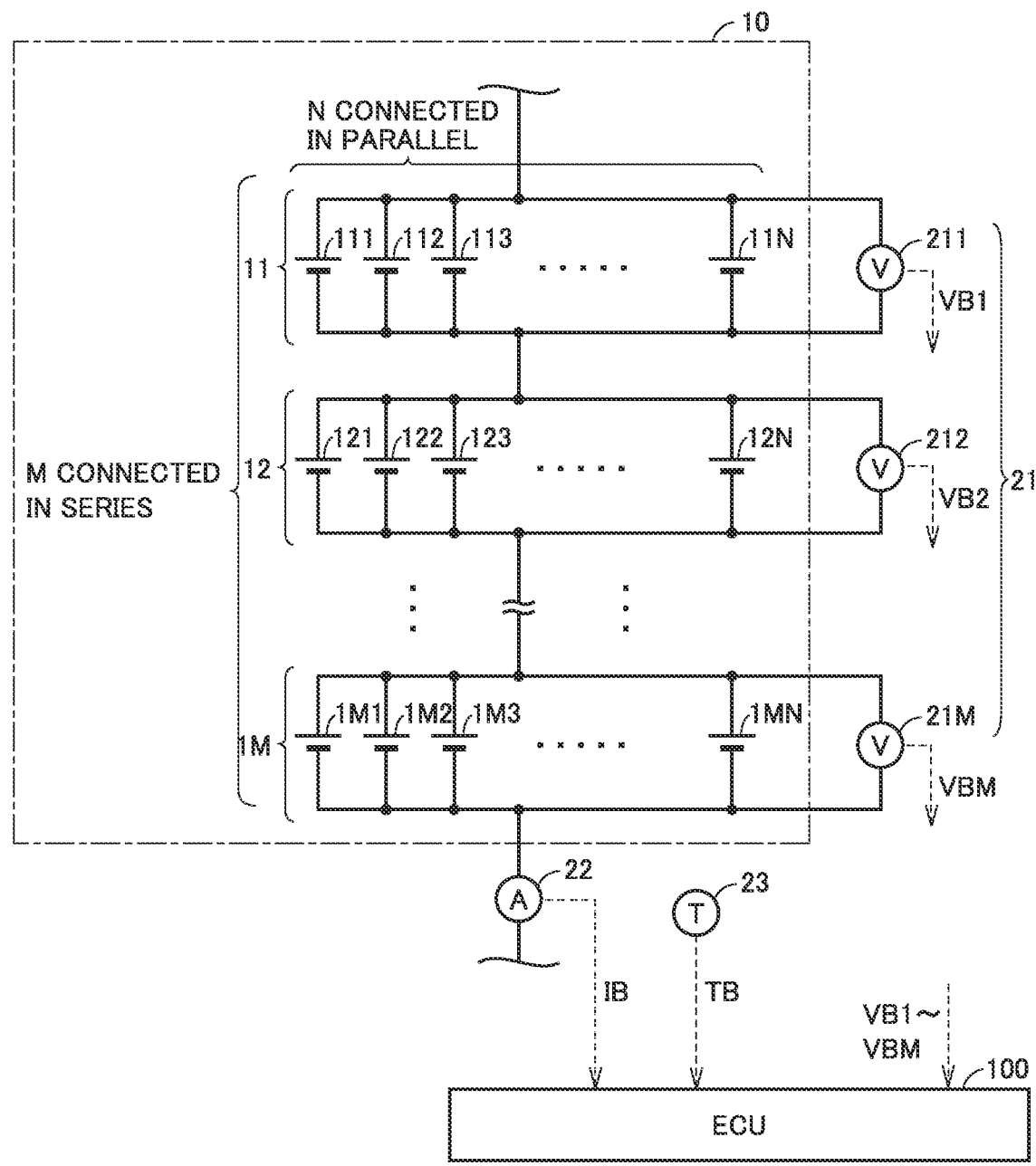
FIG. 2 shows configurations of an assembled battery and a monitoring unit more in detail.

FIG. 2 shows configurations of assembled battery 10 and monitoring unit 20 more in details. With reference to FIG. 2, assembled battery 10 includes M modules 11 to 1M connected in series. Each of modules 11 to 1M includes N cells connected in parallel. It should be noted that each of M and N is a natural number more than or equal to 2.

Voltage sensor 211 detects voltage VB1 of module 11. Voltage sensor 212 detects voltage VB2 of module 12. The same applies to the remaining voltage sensors 213 to 21M. Current sensor 22 detects current IB sent to and received from assembled battery 10. Temperature sensor 23 detects temperature TB of assembled battery 10. Each sensor outputs a detection result to ECU 100.

As shown in FIG. 2, each of voltage sensors 211 to 21M provided in assembled battery 10 detects voltage VBi (i=1 to M) of a corresponding module. This voltage VBi is a voltage of the M cells connected in parallel. Therefore, even when a high-temperature gas is released from one of the M cells and the voltage of the cell is decreased, the voltage decrease may not be detected due to an influence of the other normal cells connected in parallel. Therefore, for example, in assembled battery 10 having the configuration shown in FIG. 2, it is required to precisely detect release of a high-temperature gas (determine whether or not thermal runaway is exhibited) without using a voltage sensor.

To address this, in the first embodiment, the determination that thermal runaway has occurred is made in the following manner: a high-temperature gas is regarded as being released from assembled battery 10 when a temperature increase more than a reference amount is detected for a certain period by each of a plurality of (two in this example) temperature sensors provided for each module in different regions within flue gas duct 5 and when a temporal difference between periods of detection of the temperature increases by the two temperature sensors falls within a predetermined period. This is because a possibility of erroneously detecting a temperature increase (erroneously detecting release of a high-temperature gas) can be reduced by duplicating temperature sensors and employing such an condition that the temperature increases in the different regions are detected substantially simultaneously in the above-described manner.

FIG. 3 is a schematic view showing exemplary configurations of flue gas duct 5 and temperature sensor assembly 6. FIG. 3 shows only three modules 11 to 13 (in other words, a configuration of assembled battery 10 when M=3 is shown).

Modules 11 to 13 are arranged side by side in an x direction. Within each of modules 11 to 13, N cells are arranged in a y direction. However, in order to prevent complication of the figure, FIG. 3 shows only one cell 111 in module 11. It is assumed that this cell 111 exhibits thermal runaway to release a high-temperature gas (a flue gas path is indicated by arrows). The downward direction (negative z-axis direction) in the figure represents the vertical direction.

Cell 111 has a cylindrical case and safety valve 7 is provided at a lower portion of the case. Hence, flue gas duct 5 is also provided at the lower portions of modules 11 to 13. More specifically, at the lower portions of modules 11 to 13, flue gas duct 5 includes: a duct 51 provided at one end of each of modules 11 to 13 (end portion in the negative y-axis direction); and a duct 52 provided at the other end of each of modules 11 to 13 (end portion in the positive y-axis direction).

A part of the high-temperature gas released from cell 111 is exhausted to outside the vehicle through duct 51, and the remainder of the high-temperature gas is exhausted to outside the vehicle through duct 52. Temperature sensor 611 is provided in duct 51, and temperature sensor 612 is provided in duct 52. Thus, the high-temperature gas in duct 51 is detected by temperature sensor 611, and the high-temperature gas in duct 52 is detected by temperature sensor 612. The region in duct 51 corresponds to the "first region" according to the present disclosure, and the region in duct 52 corresponds to the "second region" according to the present disclosure.

Although detailed description is not repeated, the same applies to temperature sensors (621, 622, 631, 632) provided corresponding to other modules 12, 13. It should be noted that the configurations of flue gas duct 5 and temperature sensor assembly 6 in FIG. 3 are merely exemplary, and other configurations can be employed as long as a plurality of temperature sensors are provided in the duct so as to correspond to the respective modules.

The following representatively describes a process for detecting release of a high-temperature gas using temperature sensors 611, 612 when the high-temperature gas is released from cell 111 in module 11. For ease of description, temperature sensor 611 is denoted as a "first sensor", and temperature sensor 612 is denoted as a "second sensor". The first sensor and the second sensor respectively correspond to the "first temperature sensor" and the "second temperature sensor" according to the present disclosure.

<Thermal Runaway Determination Process>

Figure 4:
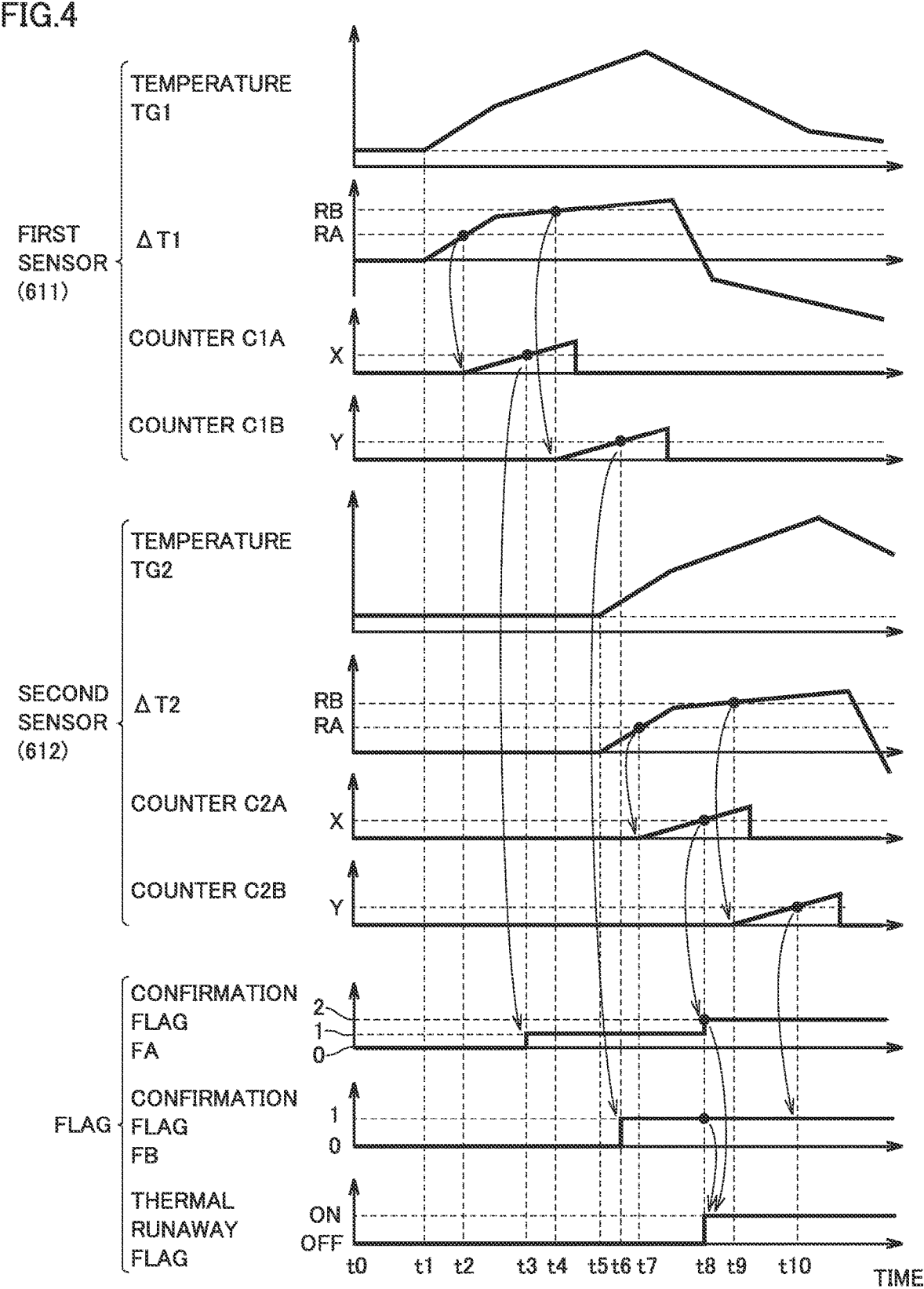
FIG. 4 is a time chart for illustrating a thermal runaway determination process in the first embodiment.

FIG. 4 is a time chart for illustrating the thermal runaway determination process in the first embodiment. In FIG. 4, the horizontal axis represents an elapsed period of time from a certain start time t0. In the order from above, the vertical axis represents: four parameters associated with the first sensor; four parameters associated with the second sensor; and three control flags set based on detection results of the first and second sensors.

As the parameters associated with the first sensor, the following parameters are indicated in the order from above: a temperature TG1 in duct 51 as detected by the first sensor; a temperature increase amount $\Delta T1$ of temperature TG1 (a difference between a temperature at the current time and a temperature at a past time from the current time by $\Delta t$ (for example, several seconds)); and two count values C1A, C1B each for measuring a time at which a temperature increase more than a reference amount occurs. The same applies to the parameters associated with the second sensor.

The control flags include: two confirmation flags FA, FB each for confirming a measurement result indicating that a temperature increase has occurred; and a thermal runaway flag (described later). Confirmation flag FA is a ternary flag indicating one of values of 0, 1, and 2. Confirmation flag FB is a binary flag indicating 0 or 1.

With reference to FIG. 4, it is assumed that no thermal runaway occurs in module 11 at a time t0, but thermal runaway then (during a period between time t0 and a time t1) occurs in one cell (in this example, a cell close to the first sensor relative to the second sensor) included in module 11 and a high-temperature gas is released.

When temperature TG1 starts to be increased from time t1 and temperature increase amount $\Delta T1$ becomes more than or equal to a reference amount RA at a time t2, one count value C1A provided corresponding to the first sensor is incremented. While temperature increase amount $\Delta T1$ is more than or equal to reference amount RA, count value C1A continues to be incremented, and count value C1A reaches a criterion value X at a time t3. Accordingly, confirmation flag FA is incremented from FA=0 to FA=1 in order to confirm the detection result indicating that the temperature increase more than or equal to reference amount RA has been detected by the first sensor.

When temperature TG1 continues to be increased and temperature increase amount $\Delta T1$ becomes more than or equal to a reference amount RB, the other count value C1B is incremented (time t4). While temperature increase amount $\Delta T1$ is more than or equal to reference amount RB, when count value C1B is increased to reach a criterion value Y (time t6), confirmation flag FB is incremented from FB=0 to FB=1. Accordingly, the detection result indicating that the temperature increase more than or equal to reference amount RB has been detected by the first sensor is confirmed.

As described below, the same process as in the first sensor also applies to the second sensor. That is, in the example shown in FIG. 4, when temperature TG2 starts to be increased from time t5 and temperature increase amount $\Delta T2$ becomes more than or equal to reference amount RA, one count value C2A is incremented (time t7). While temperature increase amount $\Delta T2$ is more than or equal to reference amount RA, when count value C2A continues to be incremented to reach criterion value X at time t8, confirmation flag FA is further incremented from FA=1 to FA=2. This means to confirm the detection results indicating that the temperature increase more than or equal to reference amount RA has been detected by both the first sensor and the second sensor. Accordingly, the thermal runaway flag is switched from off to on, thus determining that thermal runaway has occurred in one of the N cells included in module 11.

In the example shown in FIG. 4, temperature TG2 then continues to be increased, temperature increase amount $\Delta T2$ becomes more than or equal to reference amount RB, and the other count value C2B is incremented (time t9). When temperature increase amount $\Delta T2$ is more than or equal to reference amount RB, count value C2B continues to be incremented to reach criterion value Y (time t10). However, since confirmation flag FB, which is a binary flag, has already indicated 1, confirmation flag FB is not incremented anymore. A reason for this will be described as follows.

Depending on a position (position in the y direction in FIG. 3) of a cell exhibiting thermal runaway within a module, for example, when the thermal runaway occurs in a cell close to the first sensor and far from the second sensor, a temperature increase amount detected by one of the first sensor and the second sensor may be more than reference amount RB but the temperature increase amount detected by the other of the first sensor and the second sensor may not reach reference amount RB. In view of such a possibility, in the first embodiment, the determination that thermal runaway has been occurred is made when both count values C1A, C2A each corresponding to the relatively small reference amount RA become more than or equal to criterion value X and one of count values C1B, C2B each corresponding to the relatively large reference amount RB becomes more than or equal to criterion value Y.

In the example shown in FIG. 4, it has been illustratively described that common reference amounts RA, RB are set for the first sensor and the second sensor; however, different reference amounts may be set for the respective sensors. Each of reference amounts RA, RB corresponds to the "first reference amount" or the "second reference amount" according to the present disclosure.

Moreover, the period (period from time t2 to time t6) from the time at which count value C1A for the first sensor starts to be incremented after temperature increase amount $\Delta T1$ reaches reference amount RA to the time at which the other count value C1B reaches criterion value Y corresponds to the "first period" according to the present disclosure. The period (period from time t2 to time t8) from the time at which count value C1A for the first sensor starts to be incremented after temperature increase amount $\Delta T1$ reaches reference amount RA to the time at which count value C2A reaches criterion value X corresponds to the "second period" according to the present disclosure.

<Thermal Runaway Determination Flow>

In the first embodiment, the temperature increase detection process for detecting the temperature increase in flue gas duct 5 is performed in parallel with the thermal runaway determination process for determining thermal runaway of assembled battery 10 based on the process result of the temperature increase detection process.

Figure 5:
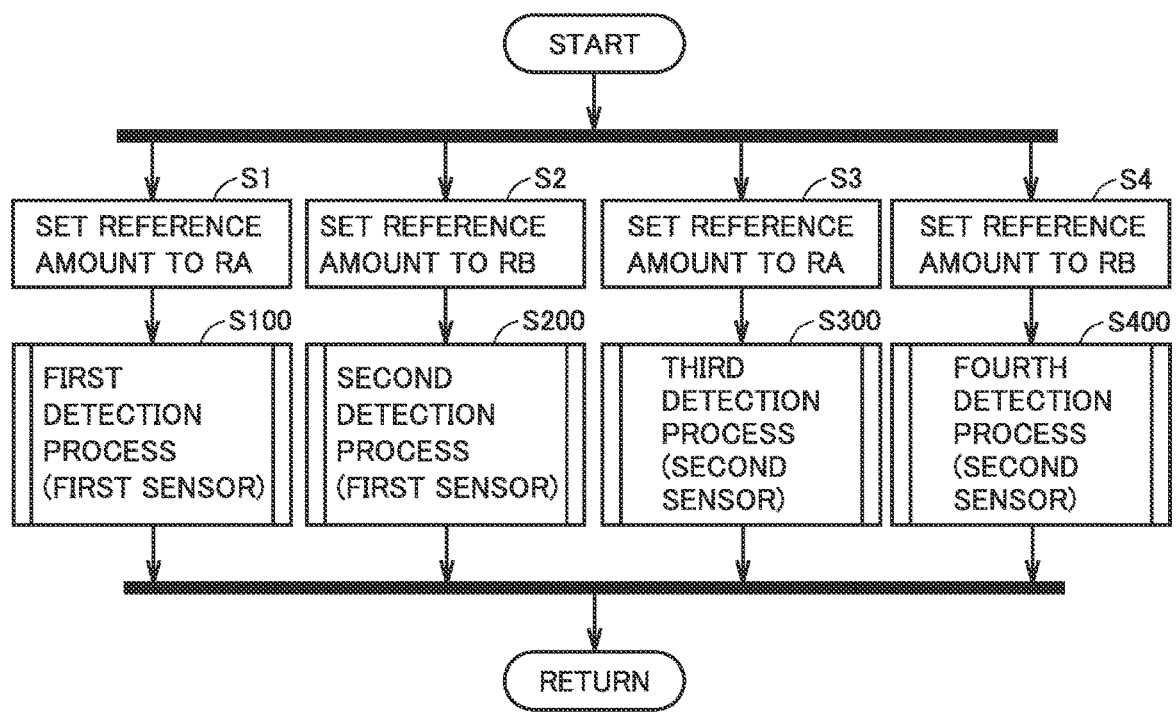
FIG. 5 is an activity diagram showing a temperature increase detection process in the first embodiment.

FIG. 5 is an activity diagram showing the temperature increase detection process in the first embodiment. This activity diagram is invoked from a main routine (not shown) and is performed when a predetermined condition is satisfied (for example, when the SOC (State Of Charge) of assembled battery 10 becomes more than or equal to a defined value or when temperature TB becomes more than or equal to a defined temperature). Each step (hereinafter, the term "step" will be abbreviated as "S") included in this activity diagram and below-described flowcharts shown in FIGS. 5 and 6 is basically implemented by a software process by ECU 100, but may be implemented by dedicated hardware (electric circuit) fabricated in ECU 100.

With reference to FIG. 5, processes in S1 and S100 and processes in S2 and S200 on the left side of FIG. 5 are processes performed in connection with the first sensor. Processes in S3 and S300 and processes in S4 and S400 on the right side of FIG. 5 are processes performed in connection with the second sensor. Two synchronization bars (fork and join) sandwiching these processes indicate that the above-described four processes are performed in parallel.

The following describes the processes in S1 and S100 on the most left side in the figure. ECU 100 sets, to RA, the reference amount used for the comparison with the temperature increase amount in duct 51 (S1), and performs a first detection process in connection with the first sensor (S100).

Figure 6:
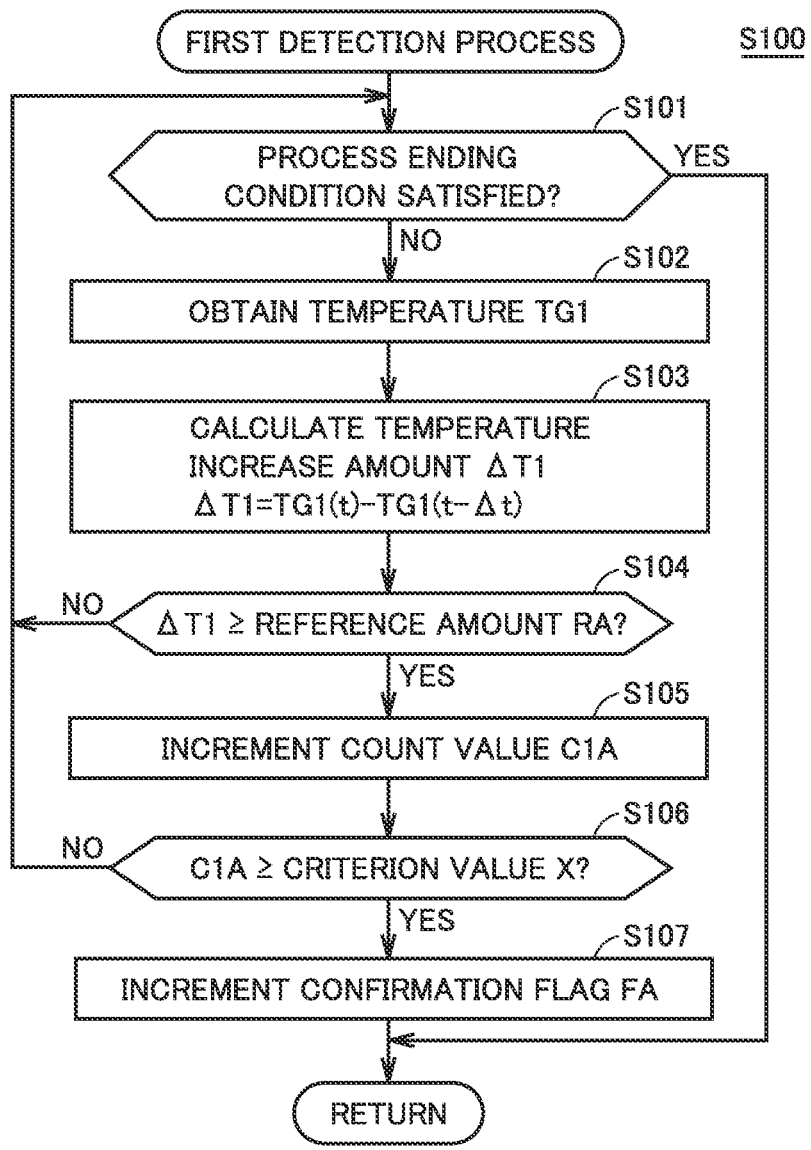
FIG. 6 is a flowchart showing details of a first detection process.

FIG. 6 is a flowchart showing details of the first detection process (temperature increase detection process in connection with the first sensor when the reference amount is RA). With reference to FIG. 4 and FIG. 6, in S101, ECU 100 determines whether or not a condition (process ending condition) for ending the temperature detection by the first sensor is satisfied. For example, when the SOC of assembled battery 10 is decreased to be less than a defined value without traveling of vehicle 1 or when temperature TB of assembled battery 10 is decreased to be less than a defined temperature (YES in S101), the process is returned to RETURN.

Until the process ending condition is satisfied (NO in S101), ECU 100 obtains temperature TG1 in duct 51 by way of the first sensor (S102).

In S103, ECU 100 calculates temperature increase amount $\Delta T1$ of temperature TG1. As temperature increase amount $\Delta T1$, there can be used a difference ($\Delta T1=TG1(t)-TG1(t-\Delta t)$) between a value (TG1($t$)) obtained in S102 at current time t and a value at a past time (TG1($t-\Delta t$)) from the current time by $\Delta t$ (for example, several seconds).

In S104, ECU 100 determines whether or not temperature increase amount $\Delta T1$ is more than or equal to reference amount RA. When temperature increase amount $\Delta T1$ is less than reference amount RA (NO in S104), the process is returned to S101 (see the period from time t0 to time t2). When temperature increase amount $\Delta T1$ is more than or equal to reference amount RA (YES in S104), ECU 100 proceeds the process to S105 to increment count value C1A (see the period from time t2 to time t3).

In S106, ECU 100 determines whether or not count value C1A is more than or equal to criterion value X. When count value C1A is less than criterion value X (NO in S106), the process is returned to S101. Accordingly, while temperature increase amount $\Delta T1$ is more than or equal to reference amount RA, count value C1A continues to be incremented.

When count value C1A reaches criterion value X (YES in S106), ECU 100 increments confirmation flag FA (S107). In the example shown in FIG. 4, at time t3, confirmation flag FA is incremented from FA=0 to FA=1. Then, ECU 100 returns the process to the activity diagram of FIG. 5.

It should be noted that although not shown in the figures, ECU 100 resets count value C1A to 0 when a defined period has passed from the start time (time t1 in the example of FIG. 4) of the temperature increase in duct 51 (see the period between time t4 and time t5).

The first detection process (process in S100) shown on the left end of FIG. 5 has been described with reference to FIG. 6; however, second to fourth detection processes (processes of S200 to S400) are performed in the same manner. These remaining three detection processes will not be described repeatedly because the three detection processes are performed in the same manner with a target sensor (the first sensor or the second sensor) and a target reference amount (RA or RB) being changed appropriately.

Figure 7:
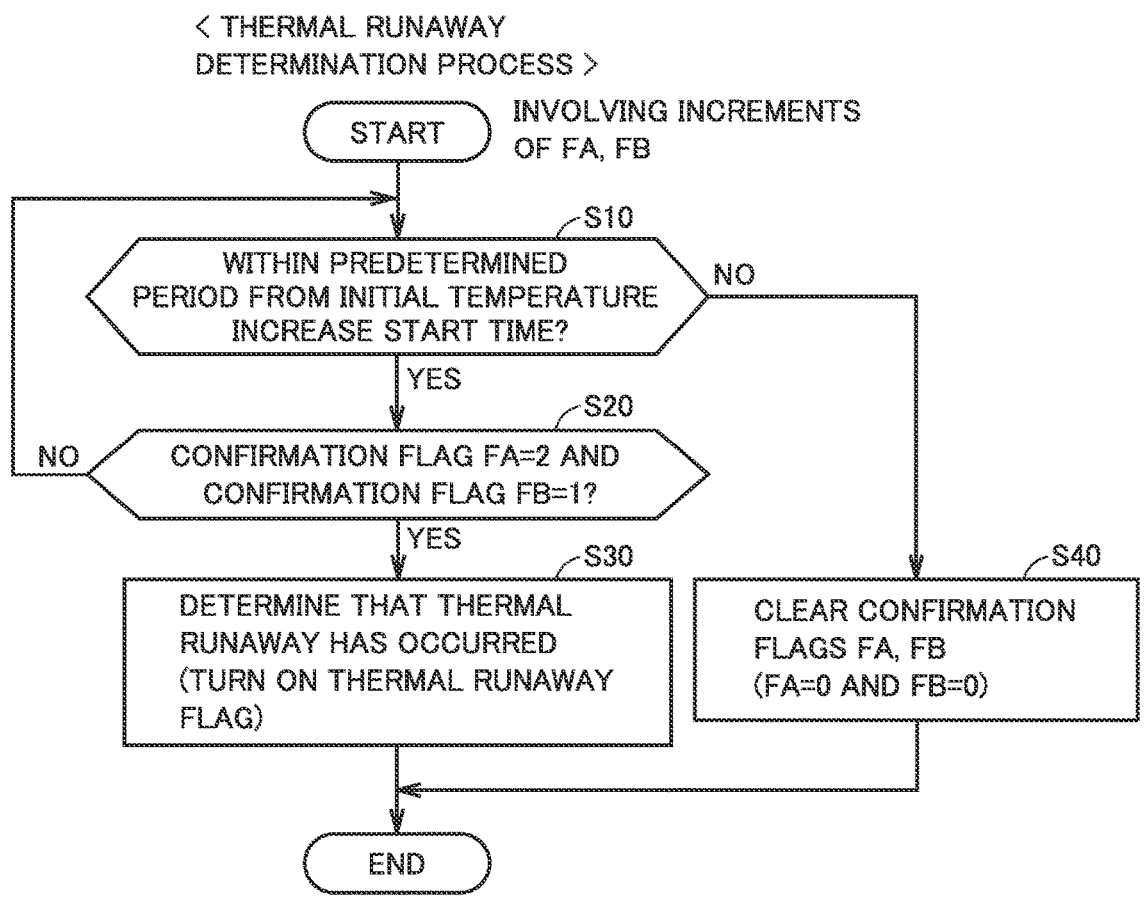
FIG. 7 is a flowchart showing the thermal runaway determination process in the first embodiment.

FIG. 7 is a flowchart showing the thermal runaway determination process in the first embodiment. This flowchart is performed when one of confirmation flags FA, FB is incremented as a result of the temperature increase detection process (first to fourth detection processes), i.e., when changed from the state of (FA, FB)=(0, 0).

With reference to FIG. 7, in S10, ECU 100 determines whether or not the current time is within a predetermined period from an initial temperature increase start time in duct 51 or 52. Specifically, the initial temperature increase start time corresponds to earlier one (time t2 in the example shown in FIG. 4) of the time at which $\Delta T1>RA$ is satisfied and the time at which $\Delta T2>RA$ is satisfied.

When the current time is within a predetermined period (described later) from the initial temperature increase start time (YES in S10), ECU 100 determines in subsequent S20 whether or not confirmation flag FA=2 and confirmation flag FB=1.

When the confirmation flags are not (FA, FB)=(2, 1) although the current time is within the predetermined period from the initial temperature increase start time (NO in S20), ECU 100 returns the process to S10. Accordingly, a period of time until the confirmation flags are switched to FA=2 and FB=1 is secured until the predetermined period elapses from the initial temperature increase start time. When FA=2 and FB=1 (YES in S20), ECU 100 turns on the thermal runaway flag (S30). That is, ECU 100 determines that thermal runaway has occurred in assembled battery 10 (specifically, at least one of the N cells included in module 11).

On the other hand, when the predetermined period has elapsed from the initial temperature increase start time without attaining FA=2 and FB=1 although confirmation flags FA, FB are incremented by the temperature increase detection process (NO in S10), ECU 100 clears confirmation flags FA, FB so as not to perform the thermal runaway determination based on them (S40). That is, ECU 100 returns confirmation flag FA to FA=0 and returns confirmation flag FB to confirmation flag FB=0.

The process proceeding to S40 after NO is determined in S10 is a process for guaranteeing simultaneity between the time of detection of the temperature increase by the first sensor and the time of detection of the temperature increase by the second sensor. More particularly, when a high-temperature gas is actually released due to thermal runaway, a temporal difference of, for example, about several seconds to several ten seconds occurs at most between the time of detection by the first sensor and the time of detection by the second sensor. Hence, when a difference between the two times of detection is deviated from the above-described temporal difference, it is not determined that thermal runaway has occurred because there is a possibility of erroneous detection. Due to the above reason, the "predetermined period" in S10 can be set to several seconds to several ten seconds, for example.

As described above, according to the first embodiment, preparation can be made for sensor malfunction by duplicating temperature sensors, i.e., providing the first sensor and the second sensor in the module including the N cells connected in parallel.

Moreover, since the first sensor is provided in duct 51 at the one end of module 11 and the second sensor is provided in duct 52 at the other end of module 11, it is detected that a temperature increase has occurred in a wide range due to a high-temperature gas released upon occurrence of thermal runaway. Further, the determination is made under a condition that an ongoing temperature increase (which may be not only continuous but also intermittent) until the count value becomes more than or equal to the criterion value is detected, rather than a condition that the temperature increase is detected only once. This makes it possible to reduce a possibility of erroneously detecting that thermal runaway has occurred even though no thermal runaway has occurred actually.

Moreover, the possibility of erroneous detection can be further reduced by further employing such a condition that a temporal difference between the time of detection of the temperature increase in duct 51 and the time of detection of the temperature increase in duct 52 is small (the temperature increase detection is performed at the two positions within the predetermined period). Therefore, according to the first embodiment, precision in determining whether or not a high-temperature gas is released from assembled battery 10 can be improved.

In the first embodiment, it has been illustratively described that the N cells are connected in parallel in each of modules 11 to 1M of assembled battery 10; however, the method for determining thermal runaway in the present disclosure is applicable irrespective of the configuration (series connection/parallel connection of the cells) of the assembled battery. Moreover, the temperature sensors (temperature sensors 611, 612, 621, 622, 631, 632) do not need to be provided for each of modules 11 to 13 as shown in FIG. 3, and one temperature sensor may be provided at the downstream of each of the flue gas paths (see the arrows in FIG. 3) of ducts 51, 52.

Moreover, it has been described that each of temperature increase amounts $\Delta T1$, $\Delta T2$ is a value that is based on, as a reference, the temperature at the past time from the current time by $\Delta t$ (for example, several seconds). However, the method for calculating each of temperature increase amounts $\Delta T1$, $\Delta T2$ is not limited to this. As one example, when no thermal runaway occurs, temperature TG1 is substantially constant. Therefore, temperature increase amount $\Delta T1$ may be a difference between temperature TG1 at the current time and a base temperature T1*base* (constant value) in an ongoing period during which temperature TG1 indicates the constant value ($\Delta T1=TG1-T1base$). The same applies to temperature increase amount $\Delta T2$.

Modification of First Embodiment

In the first embodiment, it has been illustratively described that temperature sensors 611, 612, 621, 622, 631, 632 are installed in flue gas duct 5 for exhausting, to outside, the gas released from assembled battery 10. However, the installation positions of the temperature sensors may not be in the flue gas duct as long as the temperature sensors are located in the paths in which the gas released from assembled battery 10 flows.

Figure 8:
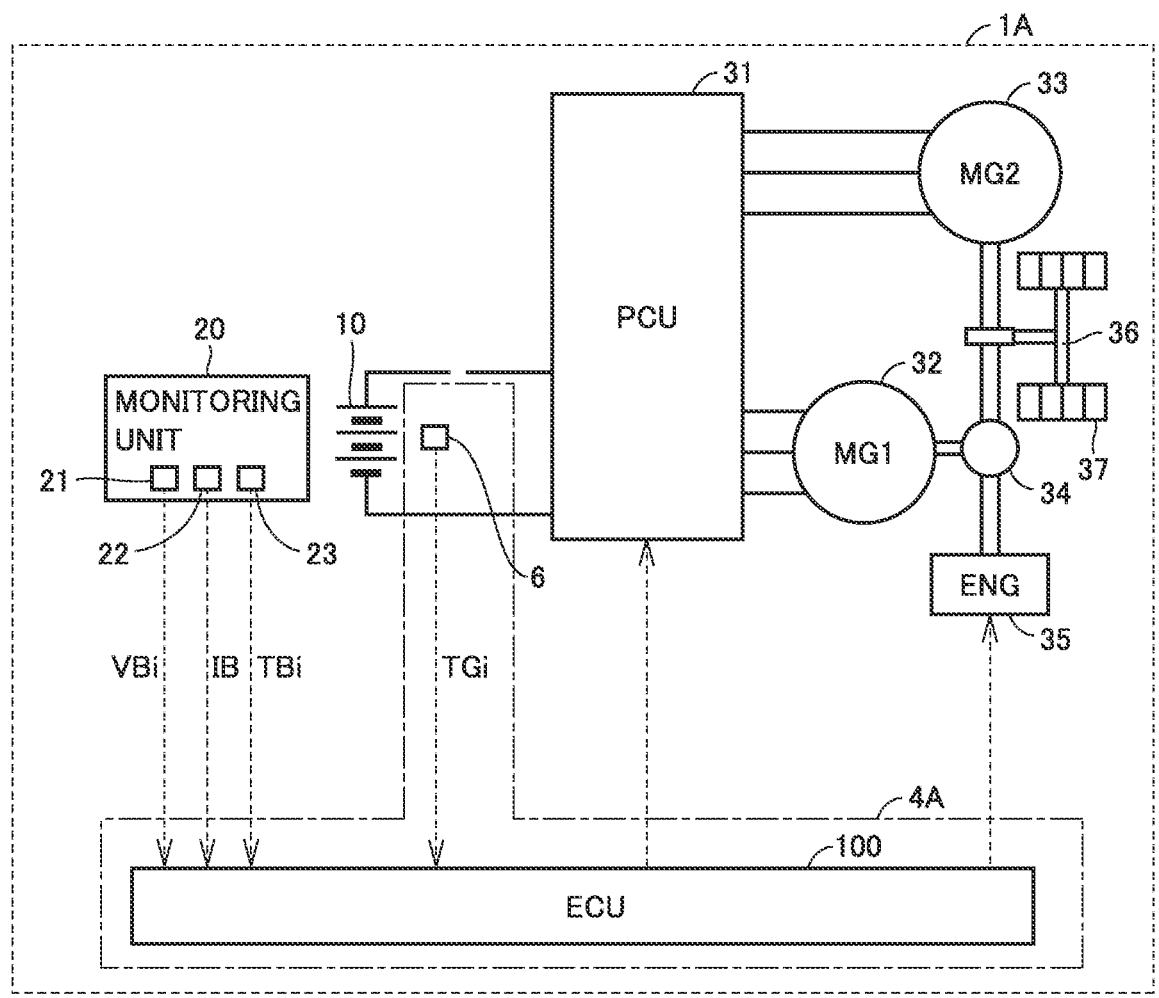
FIG. 8 schematically shows an entire configuration of a vehicle including a flue gas detection system according to a modification of the first embodiment.

FIG. 8 schematically shows an entire configuration of a vehicle including a flue gas detection system according to a modification of the first embodiment. With reference to FIG. 8, a flue gas detection system 4A according to the modification of the first embodiment is different from flue gas detection system 4 (see FIG. 1) according to the first embodiment in that flue gas detection system 4A does not include flue gas duct 5. The entire configuration of vehicle 1A is the same as the entire configuration of vehicle 1 in the first embodiment.

Figure 9:
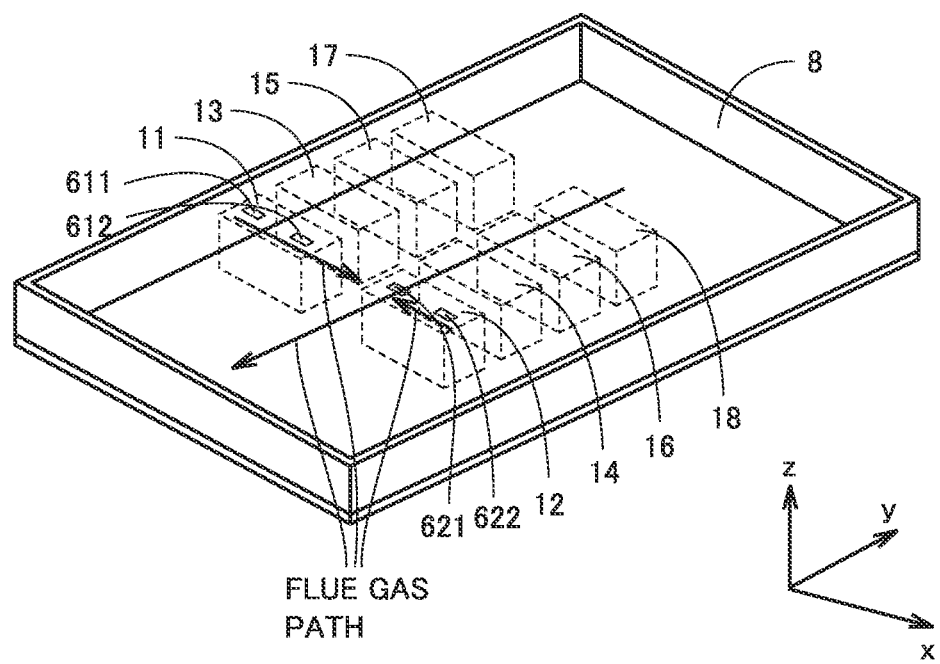
FIG. 9 schematically shows installation positions of temperature sensors in the modification of the first embodiment.

FIG. 9 schematically shows installation positions of temperature sensors in the modification of the first embodiment. FIG. 9 representatively shows modules 11 to 18 (that is, an example where M=8) of M modules 11 to 1M included in assembled battery 10. It should be noted that in order to prevent complication of the figure, each of modules 11 to 18 is indicated by a broken line. Moreover, the number M of modules is not particularly limited as with the first embodiment.

Each of modules 11 to 18 is stored in a battery case 8 (only a lower case is shown in FIG. 9). Battery case 8 is mounted, for example, on an exterior of the vehicle, and is configured to exhaust, to outside, a gas released from each of modules 11 to 18. In FIG. 9, a representative example of the flue gas path (corresponding to the "path in which the gas flows" in the present disclosure) is indicated by arrows.

Temperature sensors 611, 612 are provided in module 11. More particularly, temperature sensors 611, 612 are disposed on different cells in module 11 with a space being interposed therebetween. Each of temperature sensors 611, 612 detects a temperature of a cell (and a vicinity of the cell) on which the temperature sensor is installed, and outputs a signal indicating a detection result thereof to ECU 100.

Similarly, in module 11, temperature sensors 621, 622 are disposed on different cells with a space being interposed therebetween. Each of temperature sensors 621, 622 detects a temperature of a cell (and a vicinity of the cell) on which the temperature sensor is installed, and outputs a signal indicating a detection result thereof to ECU 100. Although not shown in the figure, temperature sensors may be similarly provided in each of the remaining modules 13 to 18.

In the example shown in FIG. 9, one of temperature sensors 611, 612 corresponds to the "first temperature sensor" according to the present disclosure, and the other corresponds to the "second temperature sensor" according to the present disclosure. Thus, in the present disclosure, the flue gas duct is not an essential component. The installation positions of the "first and second temperature sensors" according to the present disclosure (in other words, the "path in which the gas flows" in the present disclosure) are not limited to the inside of the flue gas duct. Each of the "first and second temperature sensors" may be installed on a cell.

Furthermore, the "first and second temperature sensors" according to the present disclosure may not be directly installed on the cell. Since the high-temperature gas released from (one cell included in) module 11 spreads in entire battery case 8, each of the "first and second temperature sensors" according to the present disclosure may be installed in a space covering module 11 (any position in battery case 8). In this case, each of the "first and second temperature sensors" according to the present disclosure detects an ambient temperature (temperature in the space covering module 11) of module 11.

It should be noted that since the high-temperature gas spreads in entire battery case 8, any one of temperature sensors 611, 612, 621, 622 corresponds to the "first temperature sensor" according to the present disclosure, and any other one of temperature sensors 611, 612, 621, 622 may correspond to the "second temperature sensor" according to the present disclosure.

Also in the modification of the first embodiment, by the same process (see FIG. 4 to FIG. 7) as that in the first embodiment, it is possible to reduce a possibility of erroneously detecting that thermal runaway has occurred even though no thermal runaway has occurred actually. Therefore, precision in determining whether or not a gas is released from assembled battery 10 can be improved without using a voltage sensor.

Second Embodiment

<Distinction Between Thermal Runaway and Sensor Malfunction>

A temperature increase may be erroneously detected due to malfunction of one of the plurality of temperature sensors to erroneously determine that thermal runaway has occurred even though no high-temperature gas has been released (no thermal runaway has occurred) actually. To address this, in a second embodiment, when a temperature increase is detected, the temperature increase is distinguished as to whether the temperature increase results from actual thermal runaway or results from malfunction of a temperature sensor as described below. It should be noted that configurations of a flue gas detection system according to the second embodiment and a vehicle including the flue gas detection system are the same as the configurations in the first embodiment (see FIG. 1 to FIG. 3).

Figure 10:
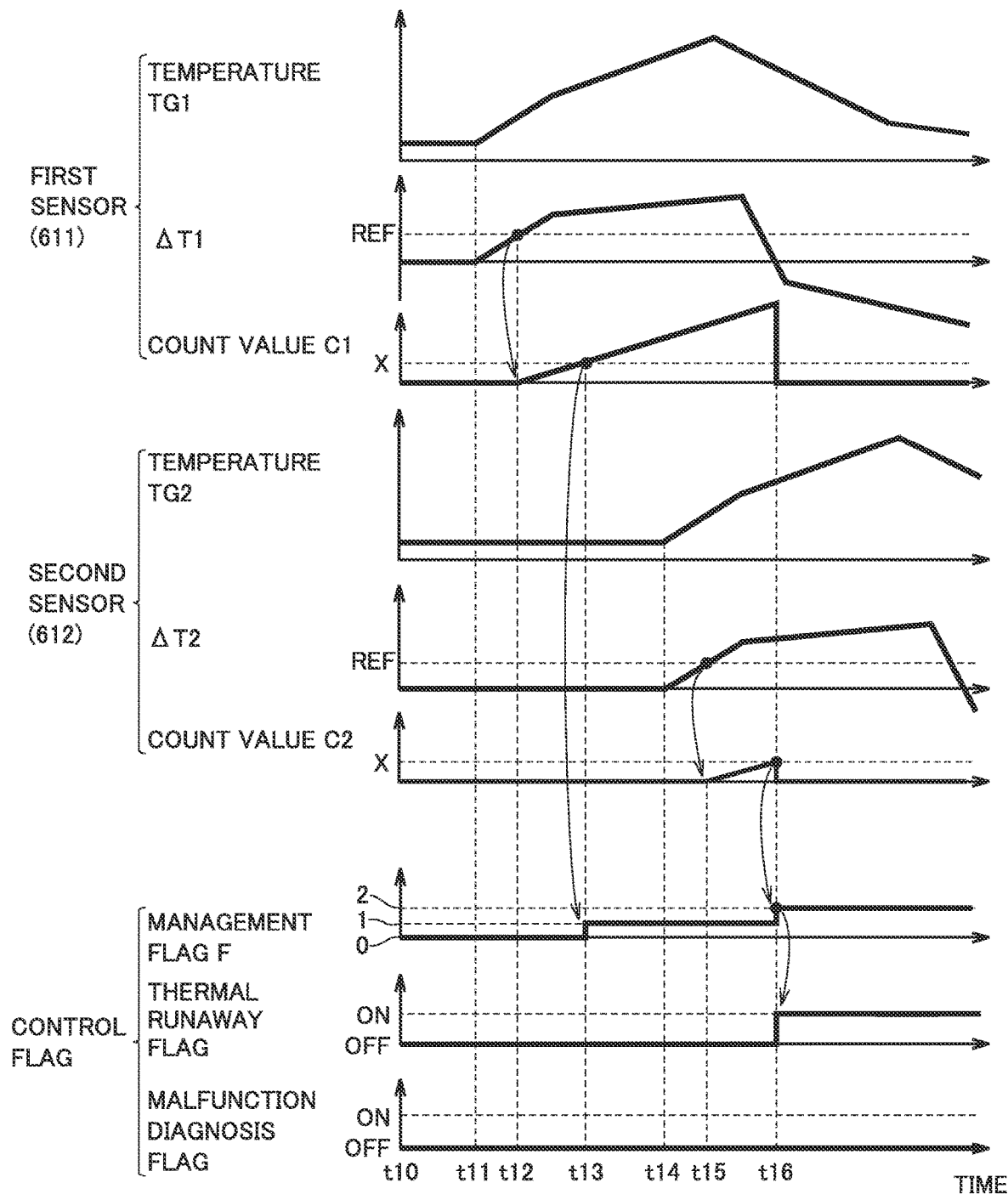
FIG. 10 is a time chart for illustrating the thermal runaway determination process when a first sensor and a second sensor are normal.

FIG. 10 is a time chart for illustrating the thermal runaway determination process while the first sensor and the second sensor are normal. In each of FIG. 10 and FIG. 11 described below, the horizontal axis represents an elapsed period of time from a certain start time t10. In the order from above, the vertical axis represents: three parameters associated with the first sensor; three parameters associated with the second sensor; and three control flags controlled based on detection results of the first and second sensors.

As the parameters associated with the first sensor, the following parameters are indicated in the order from above: a temperature TG1 in duct 51 as detected by the first sensor; a temperature increase amount ΔT1 in duct 51 between current time t and a past time (t−Δt) therefrom by Δt; and a count value C1 for measuring a time at which a temperature increase more than a reference amount REF occurs.

The same applies to the parameters associated with the second sensor. That is, the parameters associated with the second sensor include: a temperature TG2 in duct 52 as detected by the second sensor; a temperature increase amount ΔT2 in duct 52 between current time t and a past time (t−Δt) therefrom by Δt; and a count value C2 for measuring a time at which a temperature increase more than reference amount REF occurs.

The control flags include a management flag F for managing a detection result indicating that a temperature increase occurs in each of ducts 51, 52. Management flag F is a ternary flag indicating one of values of F=0, 1, and 2. Moreover, the control flags further include: a thermal runaway flag for determining whether or not thermal runaway has occurred; and a malfunction diagnosis flag for diagnosing malfunction of the first sensor or the second sensor. Each of the thermal runaway flag and the malfunction diagnosis flag is a binary flag switched between on and off.

With reference to FIG. 10, thermal runaway has not occurred in module 11 at a time t10. Then, cell 111 (cell close to the first sensor relative to the second sensor) included in module 11 is assumed to exhibit thermal runaway to release a high-temperature gas.

When temperature TG1 starts to be increased from time t11 and temperature increase amount ΔT1 becomes more than or equal to reference amount REF at a time t12, count value C1 is incremented. While temperature increase amount ΔT1 is more than or equal to reference amount REF, count value C1 continues to be incremented, and count value C1 reaches criterion value X at a time t13. Accordingly, management flag F is incremented from F=0 to F=1 in order to confirm the detection result indicating that the temperature increase more than or equal to reference amount REF has been detected by the first sensor.

The same process as in the first sensor also applies to the second sensor. That is, in the example shown in FIG. 10, when temperature TG2 starts to be increased from time t14 and temperature increase amount ΔT2 becomes more than or equal to reference amount REF, count value C2 is incremented (time t15). While temperature increase amount ΔT2 is more than or equal to reference amount REF, when count value C2 continues to be incremented to reach criterion value X at a time t16, management flag F is further incremented from F=1 to F=2. This means to obtain the detection results indicating that the temperature increase more than or equal to reference amount REF has been detected by both the first sensor and the second sensor. Accordingly, the thermal runaway flag is switched from off to on, thus determining that thermal runaway has occurred in one of the N cells included in module 11. It should be noted that in response to the switching of the thermal runaway flag, each of count value C1, C2 is reset.

Thus, in the second embodiment, the plurality of temperature sensors are provided in assembled battery 10. For example, the first sensor is provided in duct 51 at the one end of module 11, and the second sensor is provided in duct 52 at the other end of module 11. That is, the first sensor and the second sensor are provided in regions distant away from each other within flue gas duct 5. Upon occurrence of thermal runaway, a temperature increase occurs in a wide range due to a released high-temperature gas. Therefore, when the temperature increase is detected by the two temperature sensors provided to be separated from each other, it can be concluded that the temperature increase results from thermal runaway.

Moreover, in the second embodiment, it is determined that thermal runaway has occurred in module 11 when an ongoing temperature increase (which may be not only continuous but also intermittent), rather than a momentary temperature increase, until each of count values C1, C2 becomes more than or equal to criterion value X is detected. Accordingly, erroneous detection of thermal runaway due to noise or the like can be prevented.

<Malfunction Diagnosis>

Next, the following describes a situation where it is erroneously detected that thermal runaway has occurred due to malfunction of the first sensor. It is assumed that the second sensor is normal.

Figure 11:
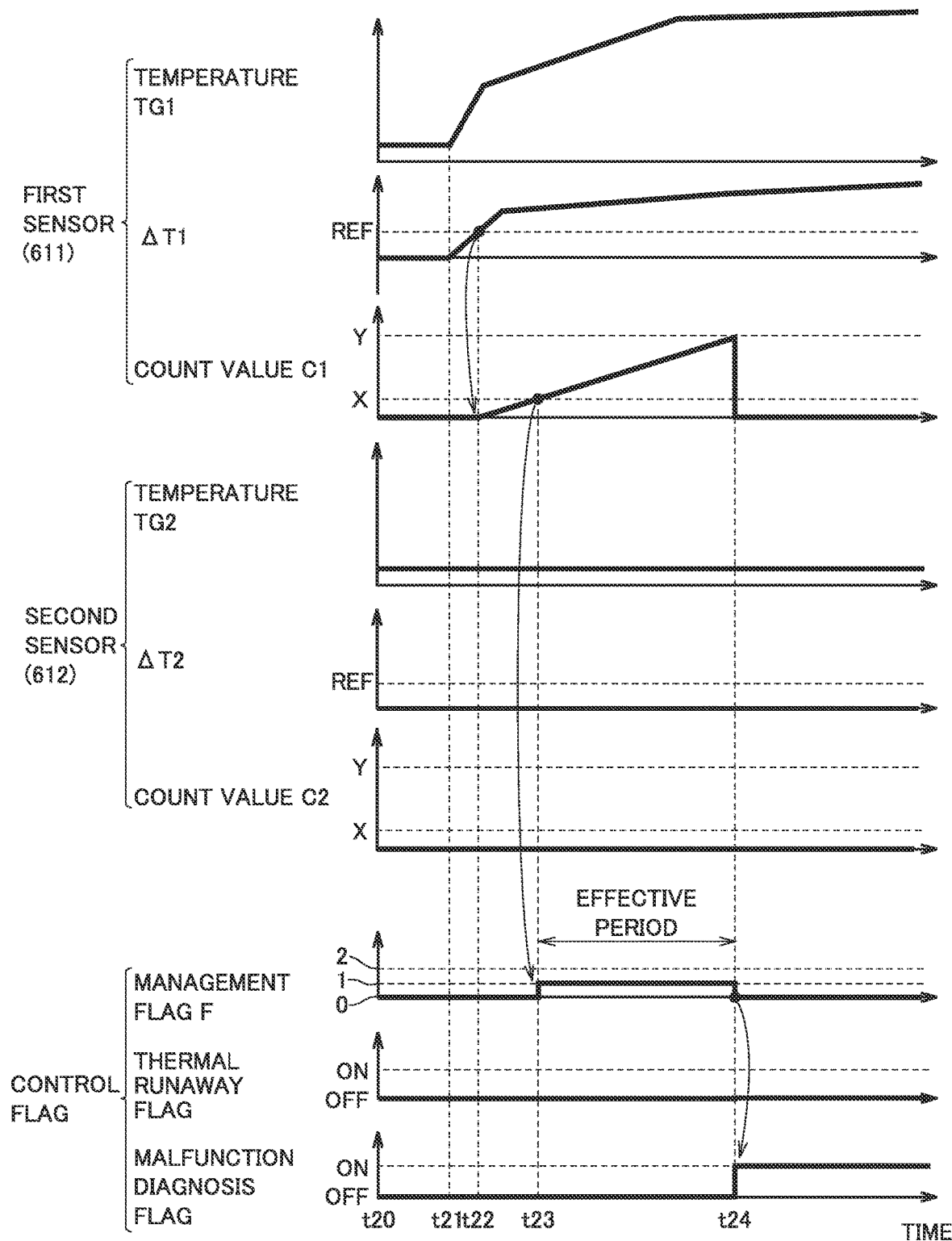
FIG. 11 is a time chart for illustrating the thermal runaway determination process when the first sensor malfunctions.

FIG. 11 is a time chart for illustrating the thermal runaway determination process when the first sensor malfunctions. With reference to FIG. 11, although no high-temperature gas is released actually, the malfunctioning first sensor detects an increase of temperature TG1 from a time t21. At a time t22, temperature increase amount ΔT1 becomes more than or equal to reference amount REF and count value C1 starts to be incremented. Then, at a time t23, count value C1 reaches criterion value X and management flag F is incremented from F=0 to F=1. On the other hand, no temperature increase is detected by the normal second sensor.

In the second embodiment, count value C1 continues to be incremented after count value C1 reaches criterion value X due to the erroneous detection of the temperature increase by the first sensor. When count value C1 reaches criterion value Y with no temperature increase being detected by the second sensor, it is regarded that the temperature increase detected by the first sensor is erroneous and management flag F is decremented (reset) from F=1 to F=0 (time t24). Accordingly, the malfunction diagnosis flag is switched from off to on to diagnose that one of the first sensor and the second sensor is malfunctioning.

As such, in the second embodiment, the determination that thermal runaway has occurred in module 11 is made under the following condition: a temporal difference between the time of detection of the temperature increase within duct 51 and the time of detection of the temperature increase within duct 52 is sufficiently small, and falls within an effective period (the effective period refers to a period from the time of detection of the temperature increase by one of the temperature sensors provided to be separated from each other to the time of detection of the temperature increase by the other temperature sensor). When the condition is satisfied, it is determined that thermal runaway has occurred in module 11, whereas when the condition is not satisfied, a temperature sensor is diagnosed to be malfunctioning, thereby specifying the cause of the temperature increase.

It should be noted that with reference to FIG. 11, it has been described that count value C1 continues to be incremented even after count value C1 reaches criterion value X; however, the continuation of the increment of count value C1 is not essential. An elapsed period of time from the detection of the temperature increase by the first sensor may be measured by another method (for example, using another counter or a timer). Then, when no temperature increase is detected by the second sensor after passage of the effective period (for example, several seconds) from the detection of the temperature increase by the first sensor, the malfunction diagnosis flag may be switched from off to on, thereby diagnosing that one of the temperature sensors is malfunctioning.

<Malfunction Diagnosis Flow>

Figure 12:
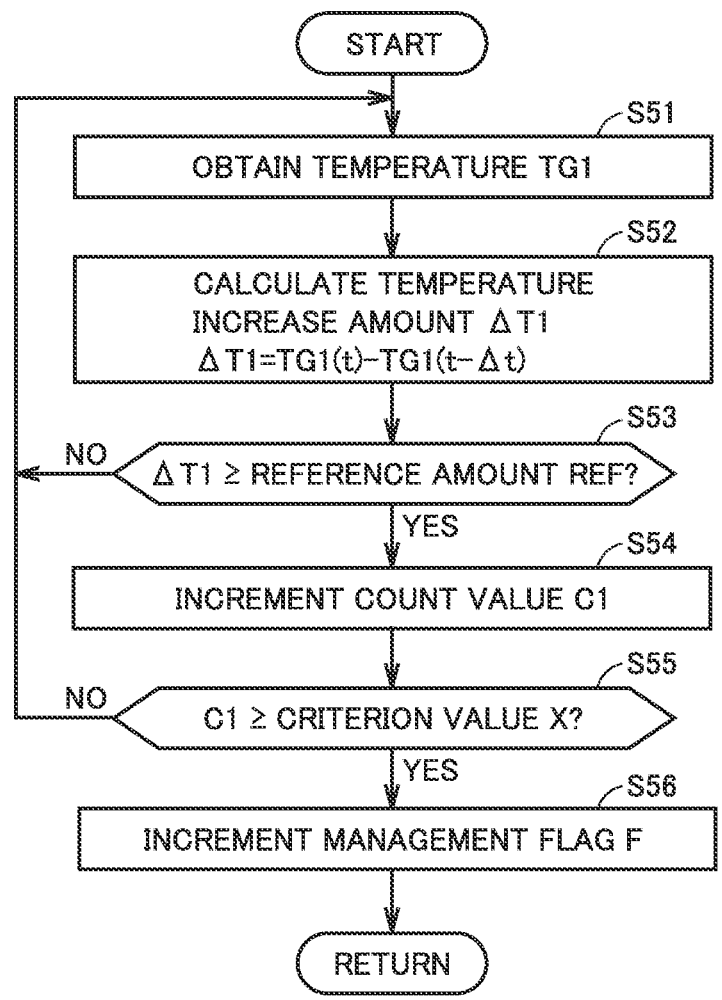
FIG. 12 is a flowchart showing a temperature increase detection process in connection with the first sensor.

FIG. 12 is a flowchart showing the temperature increase detection process in connection with the first sensor. This flowchart is invoked from a main routine (not shown) and is performed when a predetermined condition is satisfied (for example, when the SOC of assembled battery 10 becomes more than or equal to a defined value or when temperature TB becomes more than or equal to a defined temperature). Although not shown in the figure, the same process is also performed in connection with the second sensor in parallel with the process in connection with the first sensor.

With reference to FIG. 12, in S51, ECU 100 obtains temperature TG1 in duct 51 by way of the first sensor. Then, ECU 100 calculates temperature increase amount ΔT1 of temperature TG1 (S52). As temperature increase amount ΔT1, there can be used a difference between a temperatures ($TG1(t)$) obtained in S51 at current time t and a temperature at a time ($TG1(t-\Delta t)$) before the current time by Δt (for example, several seconds) ($\Delta T1=TG1(t)-TG1(t-\Delta t)$).

In S53, ECU 100 determines whether or not temperature increase amount ΔT1 is more than or equal to reference amount REF. When temperature increase amount ΔT1 is less than reference amount REF (NO in S53), the process is returned to S51. When temperature increase amount ΔT1 is more than or equal to reference amount REF (YES in S53), ECU 100 proceeds the process to S54 to increment count value C1.

For the determination as to whether or not a temperature increase in duct 51 is detected, it is also considered to compare temperature TG1 (absolute value of the temperature) with a reference value instead of comparing temperature increase amount ΔT1 (temperature difference amount) with reference amount REF. However, the temperature in duct 51 when no thermal runaway has occurred can be greatly varied due to an influence of an environment (for example, external air temperature) in which vehicle 1 is put. When the internal temperature of duct 51 is high in the first place, for example, during summertime or the like, temperature TG1 may become more than the reference value in response to a slight temperature increase. On the other hand, when the internal temperature of duct 51 is low during wintertime or the like, it may take time for temperature TG1 to become more than the reference value. Since the influence of the environment of vehicle 1 can be reduced by using temperature increase amount ΔT1 as in the second embodiment, the temperature increase in duct 51 can be detected more precisely. However, the comparison between temperature increase amount ΔT1 (temperature difference amount) and reference amount REF is not essential. A comparison may be made between temperature TG1 (absolute value of the temperature) and a reference value.

In S55, ECU 100 determines whether or not count value C1 is more than or equal to criterion value X. When count value C1 is less than criterion value X (NO in S55), the process is returned to S51. Accordingly, while temperature increase amount ΔT1 is more than or equal to reference amount REF, count value C1 continues to be incremented. When count value C1 reaches criterion value X (YES in S55), ECU 100 increments management flag F (S56).

Figure 13:
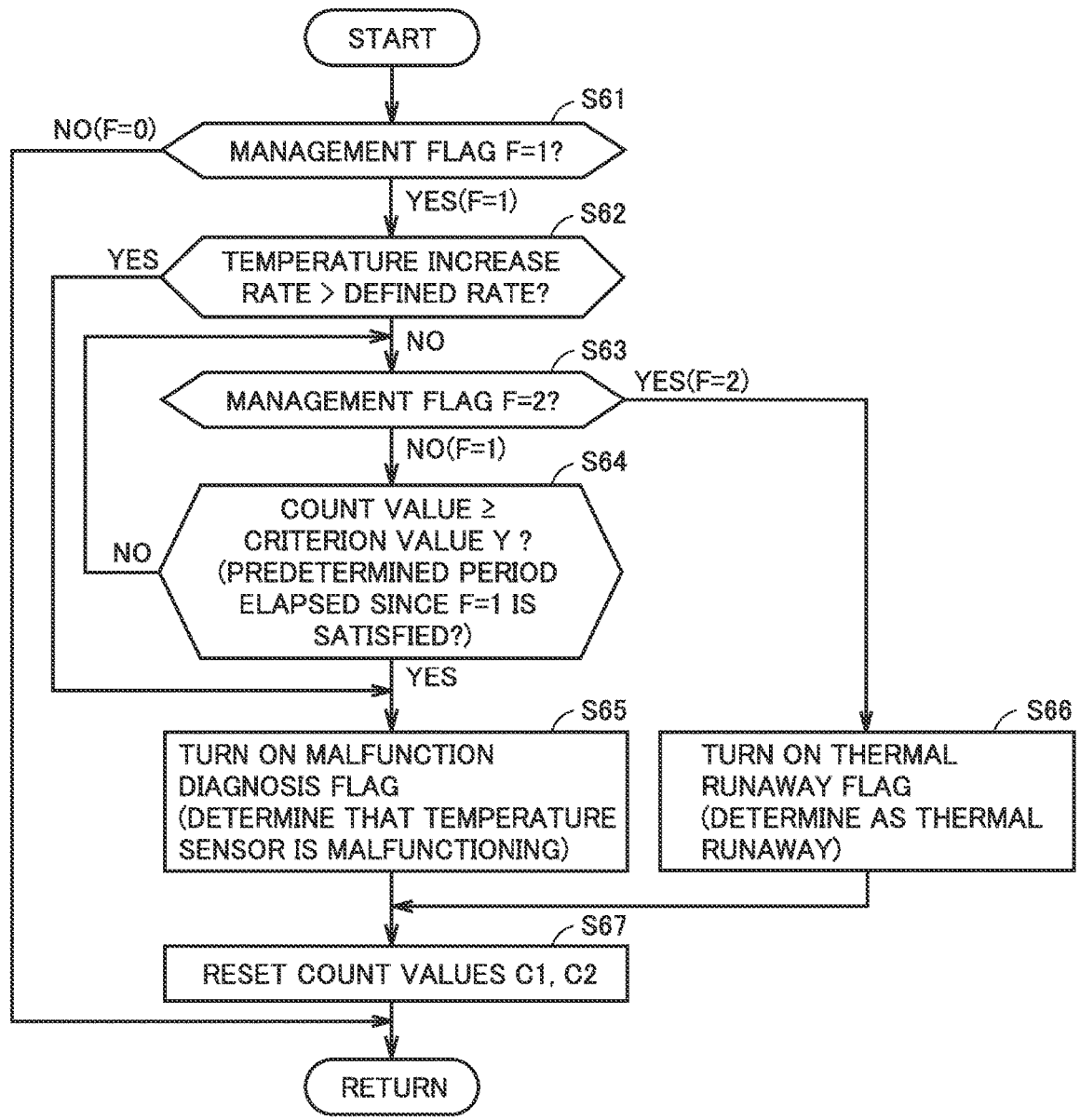
FIG. 13 is a flowchart showing a process based on a detection result of a temperature increase.

FIG. 13 is a flowchart showing a process based on a detection result of the temperature increase. This flowchart is invoked from a main routine and repeatedly executed at a predetermined cycle when management flag F is not 2 (when F=0 or 1), for example.

With reference to FIG. 13, in S61, ECU 100 determines whether or not management flag F is 1. When management flag F is 0 (NO in S61), the process is returned to RETURN. When management flag F is 1 (YES in S61), ECU 100 proceeds the process to S62.

In S62, ECU 100 determines whether or not the rate of the temperature increase detected by the first sensor (or the second sensor) until temperature increase amount ΔT1 (or ΔT2) reaches reference amount REF (temperature increase amount per unit time) is faster than a defined rate.

Figure 14:
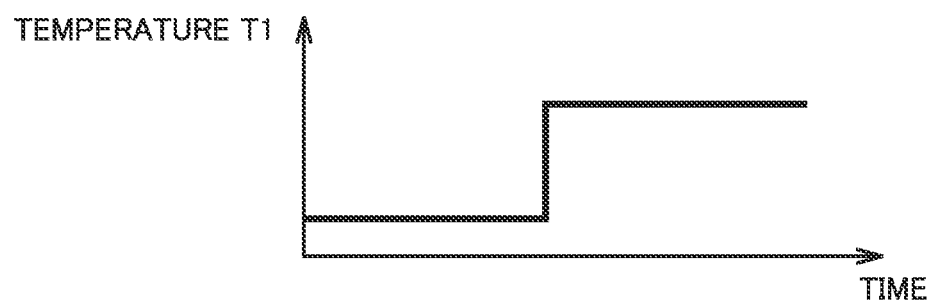
FIG. 14 shows an exemplary temperature detection result provided by a malfunctioning temperature sensor.

FIG. 14 shows an exemplary temperature detection result provided by a malfunctioning temperature sensor (the first sensor in this example). When an abrupt temperature increase such as one shown in FIG. 14 is detected, the temperature sensor having detected the temperature increase is highly likely to be malfunctioning. Therefore, when the rate of the temperature increase is faster than the defined rate (YES in S62), ECU 100 skips the processes in S63 and S64 and proceeds the process to S65 so as to determine that the temperature sensor having detected the abrupt temperature increase is malfunctioning. On the other hand, when the rate of the temperature increase is slower than the defined rate (NO in S62), ECU 100 proceeds the process to S63.

In S63, ECU 100 determines whether or not management flag F is 2. When management flag F is not 2, that is, when management flag F is still 1 (NO in S63), ECU 100 determines whether or not the count value (count value C1 in the example of FIG. 11 and FIG. 12) is more than or equal to criterion value Y (S64).

When a high-temperature gas is actually released due to thermal runaway, a temporal difference of about several seconds to several ten seconds occurs at most between the time of detection of the temperature increase by the first sensor and the time of detection of the temperature increase by the second sensor. Therefore, criterion value Y in S64 is set such that it takes about several seconds to several ten seconds for the count value to be increased from criterion value X to criterion value Y. It should be noted that the time taken for the count value to be increased from criterion value X to criterion value Y and the above-described effective period correspond to the "predetermined period" according to the present disclosure.

When management flag F becomes 2 (YES in S63) before the count value becomes more than or equal to criterion value Y (NO in S64), ECU 100 turns on the thermal runaway flag (S66). In this case, it is determined that thermal runaway has occurred in assembled battery 10 (specifically, at least one of the N cells included in module 11).

On the other hand, when the count value becomes more than or equal to criterion value Y without switching management flag F from 1 to 2 (YES in S64), ECU 100 turns on the malfunction diagnosis flag (S65). In this case, it is determined that one of the two temperature sensors is malfunctioning, rather than determining that assembled battery 10 exhibits thermal runaway.

After the end of the determination in S65 or S66, ECU 100 resets count value C1 or C2 to 0 (S67). Then, the process is returned to the main routine.

As described above, according to the second embodiment, when a temperature increase is detected by one of the first sensor and the second sensor but the temperature increase is not detected by the other of the first sensor and the second sensor within the effective period (for example, within several seconds) from the time of detection by the one of the first sensor and the second sensor, it is not determined that thermal runaway has occurred in module 11 and it is diagnosed that the temperature sensor (one of the first sensor and the second sensor) is malfunctioning. By employing such a condition that the temperature increases are detected at the two positions within the effective period, it is possible to reduce a possibility of erroneously detecting that thermal runaway has occurred even though no thermal runaway has occurred actually.

Moreover, when a temperature increase is detected by one of the first sensor and the second sensor and when the rate of the temperature increase is faster than the defined rate, it is diagnosed that the temperature sensor having detected the temperature increase is malfunctioning. For example, experiments (or simulations) are conducted in advance to measure, multiple times using the temperature sensors, the rates of temperature increases resulting from release of a high-temperature gas from a cell having exhibited thermal runaway. Then, the defined rate is set to a rate faster than the maximum rate of the rates of the temperature increases measured multiple times. By thus setting the defined rate to a rate that cannot be obtained in actual thermal runaway, the possibility of erroneously detecting thermal runaway can be further reduced. Therefore, according to the second embodiment, precision in determining whether or not a high-temperature gas is released from assembled battery 10 can be improved.

It should be noted that also in the second embodiment, the temperature sensors (the first sensor and the second sensor) may be installed inside the flue gas duct or outside the flue gas duct as long as the temperature sensors are located within the flow path in which the gas released from assembled battery 10 flows (see the modification of the first embodiment).

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A flue gas detection system provided in an assembled battery including a plurality of secondary batteries, each of the plurality of secondary batteries including a safety valve configured to release, to outside, a gas internally generated, the flue gas detection system comprising:
    a first temperature sensor configured to detect a temperature of a first region in a path in which the gas released from the assembled battery flows;
    a second temperature sensor configured to detect a temperature of a second region different from the first region in the path; and
    an electronic control unit programmed to:
    obtain a temperature of the first region from the first temperature sensor and calculate a temperature increase amount since a previous temperature was obtained from the first temperature sensor;
    calculate a first time period during which the temperature increase amount of the first region is more than a first reference amount;
    obtain a temperature of the second region from the second temperature sensor and calculate a temperature increase amount since a previous temperature was obtained from the second temperature sensor;
    calculate a second time period during which the temperature increase amount of the second region is more than a second reference amount;
    determine whether the first time period and the second time period occur within a predetermined time period;
    based upon a result that the first time period and the second time period occur within the predetermined time period, determine that the gas has been released from the assembled battery.

2. The flue gas detection system according to claim 1, further comprising a duct configured to guide, to outside of the flue gas detection system, the gas released from the assembled battery, wherein
    the first temperature sensor is configured to detect the temperature of the first region in the duct, and
    the second temperature sensor is configured to detect the temperature of the second region in the duct.

3. The flue gas detection system according to claim 1, wherein the electronic control unit is programmed to determine that one of the first and second temperature sensors malfunctions, when the first time period and the second time period do not occur within the predetermined time period.

4. The flue gas detection system according to claim 3, wherein the electronic control unit is programmed to determine that the first temperature sensor malfunctions, when a temperature increase of the first region is detected by the first temperature sensor and when a rate of the temperature increase of the first region is faster than a defined rate.

5. The flue gas detection system according to claim 1, wherein
    the assembled battery includes a module, and
    the module includes two or more secondary batteries connected to each other in parallel in the plurality of secondary batteries.

6. A method for detecting a flue gas from an assembled battery including a plurality of secondary batteries, each of the plurality of secondary batteries being configured to release, to outside, a gas internally generated, the method comprising:
    detecting, by a first temperature sensor, a temperature of a first region in a path in which the gas released from the assembled battery flows;
    calculating a temperature increase amount of the first region since a previous temperature was obtained from the first temperature sensor;
    calculating a first time period during which the temperature increase amount of the first region is more than a first reference amount;
    detecting, by a second temperature sensor, a temperature of a second region different from the first region in the path;
    calculating a temperature increase amount of the second region since a previous temperature was obtained from the second temperature sensor;
    calculating a second time period during which the temperature increase amount of the second region is more than a second reference amount;
    determining whether the first time period and the second time period occur within a predetermined time period;
    based upon a result that the first time period and the second time period occur within the predetermined time period, and determining that the gas is released from the assembled battery.

7. The method according to claim 6, further comprising determining that one of the first and second temperature sensors malfunctions, when the first time period and the second time period do not occur within the predetermined period.

8. The method according to claim 7, wherein the determining that one of the first and second temperature sensors malfunctions includes determining that the first temperature sensor malfunctions, when a temperature increase of the first region is detected by the first temperature sensor and when a rate of the temperature increase of the first region is faster than a defined rate.

* * * * *